US005527579A

United States Patent [19]

Aho

[11] Patent Number: 5,527,579

[45] Date of Patent: Jun. 18, 1996

[54] WOOD SURFACE LAYER FOR A PARQUET AND METHOD FOR MANUFACTURING THE SAME

[75] Inventor: Yrjo Aho, Espoo, Finland

[73] Assignees: Jyrki Aho; Jutta Casserly, both of Finland

[21] Appl. No.: 354,239

[22] Filed: Dec. 12, 1994

Related U.S. Application Data

[63] Continuation of Ser. No. 70,374, Jun. 1, 1993, abandoned.

[30] Foreign Application Priority Data

Dec. 5, 1990 [FI] Finland .................................... 906014

[51] Int. Cl.$^6$ ................................ B32B 3/14; B27K 5/00; B05D 7/08

[52] U.S. Cl. ................................ 428/50; 428/44; 428/58; 428/219; 428/340; 428/537.1; 156/71; 156/280; 156/304.6; 156/305; 156/332

[58] Field of Search .................................... 428/537.1, 50, 428/58, 44, 219, 340; 156/71, 280, 304.6, 305, 332

[56] References Cited

FOREIGN PATENT DOCUMENTS 1209851 10/1970 United Kingdom .

2044312 10/1980 United Kingdom .

OTHER PUBLICATIONS

Abstract, Derwent, DE3045077–A, Jul./1982 #82–H918IE/27.

Abstract, Derwent, DE1492562–B, Jun./1963 #71–57499S/36.

Abstract, Derwent, SU–612944–A, Jun./1978 #79–36660B/19.

*Primary Examiner*—P. C. Sluby

*Attorney, Agent, or Firm*—Zarley, McKee, Thomte, Woorhees & Sease

[57] ABSTRACT

The invention relates to a wood surface layer for a parquet and a method for manufacturing the same. A piece of fresh wood is cut in the cross-grain direction into slices or blocks which are carried through a microwave oven. Immediately downstream of the oven, as the slices or blocks are cooling, the surface thereof is coated with a water-soluble polyalcohol which impregnates in wood as a result of the action of a vacuum developing within the wood. The polyalcohol replaces some of the cell-wall water of wood and thus prevents the formation of seasoning cracks and the moisture induced movements in wood.

10 Claims, 1 Drawing Sheet

WOOD SURFACE LAYER FOR A PARQUET AND METHOD FOR MANUFACTURING THE SAME

This application is a continuation of application Ser. No. 08/070,374 filed on Jun. 1, 1993 having an International filing date of Dec. 5, 1991 for PCT/FI91/00375, now abandoned.

The present invention relates to a wood surface layer for a parquet, wherein the wood grains extend perpendicularly or at an angle substantially deviating from zero relative to the plane of a parquet surface. The invention relates also to a method for manufacturing such a wood surface layer.

The use of vertically grained wood as a parquet surface layer offers several benefits. Wear resistance, hardness and compression strength in the direction of wood grains are clearly superior to the same values in the direction perpendicular to wood grains.

However, the use of vertically grained wood as a parquet surface layer involves several problems with no satisfactory solution thus far and, therefore, a commercial breakthrough is yet to be achieved as well. One problem is the formation of seasoning cracks and after-movements (dimensional fluctuation) as a result of moisture variations. Another problem is the porosity of a finished wood surface. If a porous surface is conventionally coated with parquet lacquer layers (e.g. UV-setting urethane lacquers), the thin film of lacquer would be rapidly ruptured when subjected to wear. The film develops dot-like ruptures with moisture penetrating therethrough in wood and the surface blackens. The traditional horizontally grained parquets employ a wood non-impregnating primer varnish which builds a film-like seal between wood and coating lacquer layers. The total consumption of expensive parquet lacquers remains relatively low, all in all appr. 30–40 $g/m^2$. However, this type of parquet varnishing technique, with a prime varnish seal being applied directly to a ground wood surface, would in the invention lead to an unfavourable and unstable surface structure.

An object of the invention is to provide a parquet structure and its manufacturing method, capable of avoiding the cracking of a wood surface layer upon drying or seasoning thereof and also capable of substantially eliminating the after-movements caused by moisture fluctions.

This object is achieved by means of a wood surface layer as set forth in the annexed claim 1 and by means of a method as set forth in claim 4 for manufacturing a wood surface layer.

A further object of the invention is yet to improve this parquet structure and its manufacturing method in a manner that even the otherwise good wear resistance and hardness of vertically grianed wood can still be substantially increased while providing an effective extra shield to the penetration of moisture and an effective binding against the forces of remaining moisture-induced movements and, yet at the same time, the amount of expensive parquet lacquer can be conventional.

This further object is achieved by means of a wood surface layer as set forth in the annexed claim 3 and by means of a method as set forth in claim 10 for manufacturing the same.

A parquet surface layer of the invention and its manufacturing method will, now be described in more detail with reference made to the accompanying drawings, in which FIG. 1 is a schematic plan view showing the various working sequences for wood slices or blocks used in the manufacture of a wood surface layer by applying a method of the invention.

Figure 1:
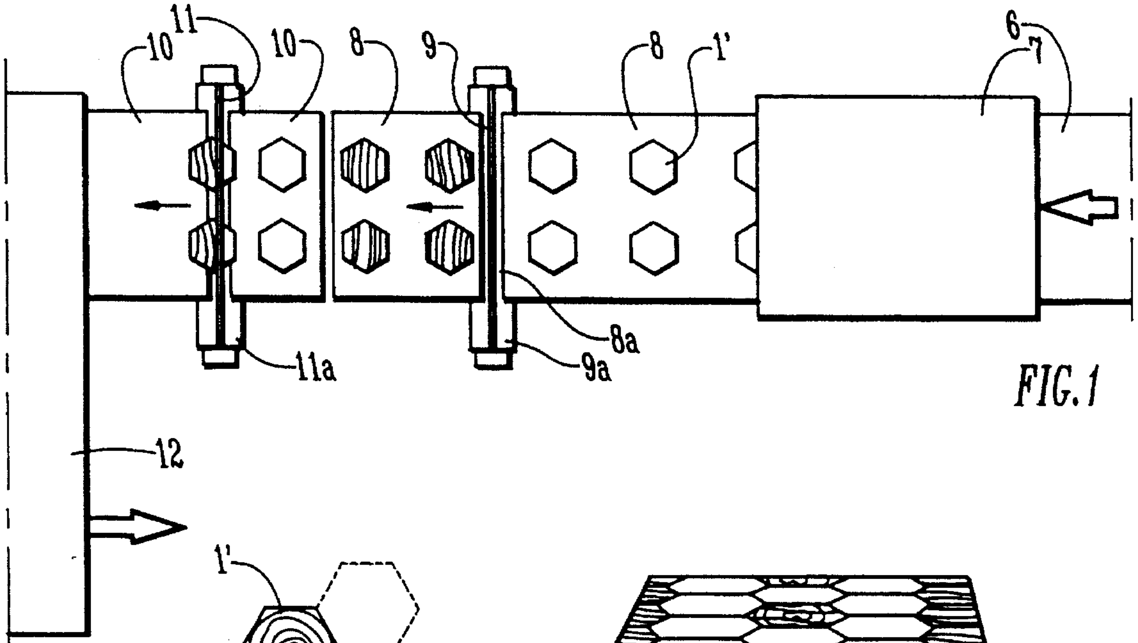
Figure 2:
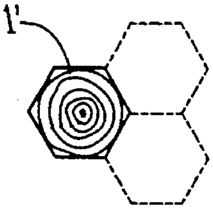
FIG. 2 illustrates hexagonal wood slices or blocks which have been treated with a method of the invention for use in a parquet wood surface layer.
Figure 3:
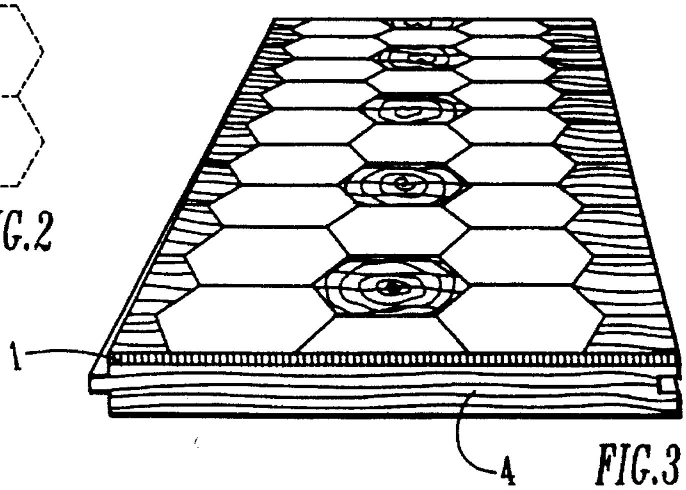
FIG. 3 is a perspective view of a cross-sectioned parquet element which has a structure of the invention.
Figure 4:
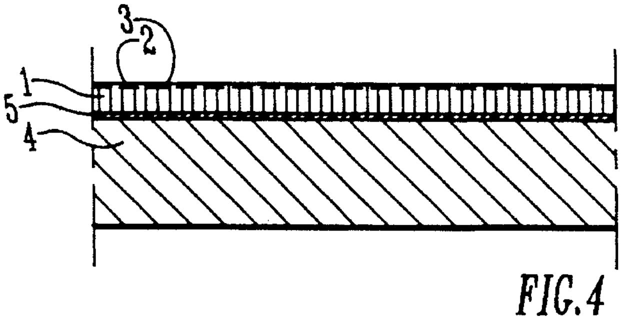
FIG. 4 is a cross-section of a sandwich parquet structure.
Figure 5:
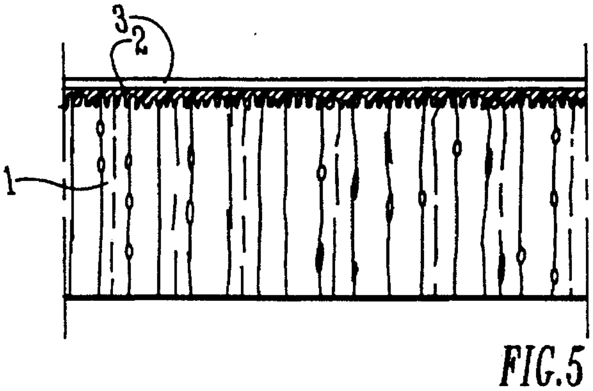
FIG. 5 shows in a larger scale a vertical section of a parquet wood surface layer with the wood grains extending in vertical direction.

The manufacturing of a wood surface layer of the invention proceeds as follows. Slices or blocks of suitable thickness are cut from a fresh polygonal wood balk perpendicularly or at an acute angle to the wood grains. At this point, the slices or blocks may have a thickness of e. g. 14 mm. These wood slices or blocks, FIG. 2 showing a hexagonal example, are impregnated with a water-soluble polyalcohol, for example polyethylene glycol (PEG). The purpose of this is that the water-soluble impregnant replaces a sufficient amount of the cell-wall water of wood cells. This prevents the formation of seasoning cracks in wood and after-movements (dimensional fluctuations) caused by moisture variations. As well known, the moisture-induced movements of wood are definitely caused by an amount of water contained in cell walls and by the swelling and shrinking of a cell wall resulting from fluctuations in said amount of water.

In order to impregnate a ployalcohol rapidly and continuously within wood, the invention proceeds as follows. The slices or blocks cut off of fresh wood are carried onto a loading table 6 including a conveyor for carrying the slices or blocks into a microwave oven 7 for heating and also partially evaporating the internal water of wood. The temperature of wood slices or blocks 1' flowing out of oven 7 and that of the water, water vapour and air contained therein lies within the range of appr. 40°–90° C. Conveyors 8 and 10 downstream of oven 7 are at room temperature, resulting in the cooling of wood and water vapour and hot air contained therein. This results in the development of vacuum within the interior of wood, which facilitates and accelerates the impregnation of polyalcohol within wood. A nozzle 9 is used to drain non-diluted polyalcohol in the form of a suitably heated thin flowable film, which trickles through a gap **8*a* between the successive sections of track 8 into a receiving trough 9. Thus, the film spreads over wood slices or blocks advancing upon conveyor track 8, passing over gap 8*a* and beneath nozzle 9. Between tracks 8 and 10 said wood blocks are turned over and a nozzle 11** is used to apply a polyalcohol film to the opposite surfaces of the blocks. The water-soluble polyalcohol impregnates well within wood as a result of its moisture and vacuum. A preferred polyalcohol is polyethylene glycol having a molecular weight within the range of 600–1200. Naturally, it is also possible to employ other water-soluble wood processing polyalcohols capable of replacing cell-wall water in wood.

In the following operation, the wood slices or blocks are advanced or carried into a heat-treating storage 12, having a temperature of appr. 50°–80° C. In this heat-treating storage the wood slices or blocks are held appr. 1–3 days, during which time the penetration (diffusion) of polyalcohol to a sufficient depth on either side of a wood block. The blocks thus impregnated with polyalcohol are removed from heat-treating storage and dried whereby, upon the removal of water, the polyalcohol concentrates. The block surfaces are ground and the contours are worked to precise dimensions. Thereafter, the blocks are glued to create board parquet blanks, i.e. the blocks are edhered between two basic layers 4. The adhesion to a basic parquet element layer 4 can be effected with a resin or a wood-based adhesive 5 (e.g. polyester resin or polyvinyl acetate adhesive). The base 4 can be preferably made of plywood having a thickness of e.g. 9 mm. The base 4 may also include one or more layers of reinforced plastics. The blank is sawn through in the middle of wood blocks 1 and the resulting boards are worked to form butments and the sawn-off surfaces are ground smooth. Following the sawing and grinding operation, the vertically grained surface layer 1 has a thickness of e.g. 3,0–3,5 mm.

The surface of a finished wood parquet element is coated with a filling resin or varnish, lying underneath parquet lacquer layers 3, which is allowed to impregnate within and between the wood grains. The impregnation of filling resin is accelerated basically the same way as described above in connection with the impregnation of PEG. Thus, the boards are pre-heated whereby, upon cooling, they absorb the resin to a sufficient depth within and between the wood grains. One preferred filling resin or varnish is an inexpensive polyester resin, whereby the parquet manufacturing costs remain reasonable despite the fact that, due to the porosity of a surface, the required amount of resin will be more than 100 μg/m$^2$ typically 100–300 g/m$^2$, preferably 150–200 g/m$^2$. Thus the filling resin or varnish adsorbs locally to the depth of up to 0,5 mm and over most of the surface area to the depth of more than 0,2 mm. Hence, the thickness of filling resin or varnish layer 2 impregnating in wood varies according to the porosity and absorbability of wood but is typically within the above range. The process preferably employs a UV-setting polyester resin but another possibility is a conventional, extra heat activated (accelerated) setting reaction. A layer consisting of filling resin or varnish 2 increases substantially the wear resistance and hardness of vertically grained wood. The surface filling layer also provides an additional protection against the penetration of moisture and, at the same time, reinforces the structure against the forces created by the remaining mosture-induced movements.

By virtue of filling layer 2, the consumption of expensive parquet lacquers, such as UV-setting polyurethane lacquers, remains on the same level or will be lower than in conventional board parquets, i.e. typically 20–50 g/m$^2$ Thus the amount of filling resin or varnish to be impregnated within wood is appr. 4–5 times that of a parquet lacquer. However, the price of e.g. polyester resin is only a fraction of that of the UV-setting urethane lacquer used as a parquet lacquer.

A method of the invention is also suitable for manufacturing a high-quality parquet from soft grades of wood. For example, alder has been used to manufacture for test purposes a vertically-grained wood parquet having an approximately double hardness and a multiple wear resistance as compared to normal oakwood parquet. Also aspen can be used to produce a parquet competitive with the available grade of parquet in terms of wear resistance and hardness. The same applies also to the relatives of aspen, e.g. poplar. Indeed, one discovery and benefit of the invention relates to the very use of soft grades of wood. Since the compression strength of soft grades of wood in the cross-grain direction is low, the cross-grain directed forces, which the grain texture is capable of transmitting, remain low as well and this is another reason why the moisture-induced movements of a parquet will also remain negligible.

A single parquet element can be made to be relatively wide (e.g. 278 cm), whereby it is possible to create a wide range of designs-by varying the laying-down patterns of wood blocks which vay in terms of colour tones and sizes/designs. The possibility of using inexpensive wood materials such as alder and aspen renders a parquet structure of the invention competitive also in terms of price.

This method can be applied to the manufacture of finished parquet or board parquet but it is also applicable to genuine parquet to be laid directly on the floor to match a traditional floor parquet, wherein the blocks are glued directly to the floor, ground and varnished with parquet lacquers.

I claim:

1. A wood surface layer for a parquet, wherein the wood grains extend perpendicularly or at an angle substantially deviating from zero relative to the plane of a parquet surface, and over substantially the entire thickness of a wood surface layer wherein some of the cell-wall water of wood is replaced by a water-soluble polyalcohol wherein between and within the vertical wood grains to the depth of from 0.1 to 0.5 mm., the wood surface layer is impregnated with a filling resin or varnish whose amount is within the range of from about 100 to about 300 g/m$^2$, and upon this a parquet lacquer is applied in an amount within the range of from about 20 to 50 g/m$^2$.

2. A wood surface layer for a parquet as set forth in claim 1, wherein the wood is selected from the group consisting of alder, aspen, and poplar.

3. A method for manufacturing a parquet surface layer in which the surface layer wood grains extend perpendicularly or at an angle substantially deviating from zero relative to the plane of a parquet surface, comprising heating wood slices used for the manufacture of said surface layer in a heating furnace and coating the hot surfaces of said slices with a wood-impregnating water-soluble polyalcohol which replaces some of the cell-wall water of wood, said water-soluble polyalcohol being applied to wood surface while it is in heated condition and thereafter cooling the hot wet wood to develop a vacuum therein to absorb the polyalcohol to the interior of wood, and thereafter applying a filling resin, the amount of said filling resin being more than 100 g/m$^2$ and, on top of said filling resin, applying a parquet lacquer in an amount of 20 to 50 g/m$^2$.

4. A method as set forth in claim 3, wherein the polyalcohol is heated polyethylene glycol in a non-diluted condition.

5. A method as set forth in claim 3 or 4, wherein the slices cut off of fresh wood in the cross-grain direction are carried through an oven wherein the wood and the water, water vapour and air contained therein are heated to a temperature range of appr. 45°–90° C., and that the heating cycle is maintained so short that there is no time for a substantial wood drying before the water-soluble polyalcohol is applied to wood surface.

6. A method as set forth in claim 5, wherein the polyalcohol is applied in the form of a film discharged from a nozzle onto the wood slices carried on a conveyor.

7. A method as set forth in claim 5 wherein following the application of the polyalcohol impregnant said wood slices or blocks are maintained at a temperature of from 50° to 80° C. for from 1 to 3 days before adhering to a basic parquet.

8. A method as set forth in claim 3, wherein said filling resin consists essentially of a UV-setting polyester resin and said parquet lacquer comprises a UV-setting urethane lacquer.

9. A method as set forth in claim 3, wherein said filling resin is applied to the surface of a heat parquet element during its cooling cycle.

10. A method for manufacturing a parquet surface layer in which the surface layer wood grains extend perpendicularly or at an angle substantially deviating from zero relative to the plane of a parquet surface, comprising:

heating wood slices used for the manufacture of said surface layer in a heating furnace and coating the hot surfaces of said slices with a wood-impregnating water-soluble polyalcohol which replaces some of the cell-wall water of wood, said water-soluble polyalcohol being applied to wood surface while it is in a heated condition;

thereafter cooling the hot wet wood to develop a vacuum therein to absorb the polyalcohol to the interior of the wood;

thereafter impregnating the wood with a filling resin to a depth of 0.1 to 0.5 mm, the amount of said resin being more than 100 $g/m^2$, said filling resin being applied to the wood surface while it is in a heated condition and thereafter cooling the hot wet wood to develop a vacuum therein to absorb the filling resin to the interior of the wood;

thereafter applying a parquet lacquer in an amount of 20 to 50 $g/m^2$.

* * * * *